(12) United States Patent
Sasaki et al.

(10) Patent No.: US 7,307,753 B2
(45) Date of Patent: Dec. 11, 2007

(54) COLOR PROCESSING METHOD, COLOR PROCESSING DEVICE, STORAGE MEDIUM, COLOR PROCESSING PROGRAM, AND IMAGE FORMING APPARATUS

(75) Inventors: Makoto Sasaki, Kanagawa (JP);
Hitoshi Ogatsu, Kanagawa (JP);
Hiroaki Ikegami, Kanagawa (JP);
Ryosuke Higashikata, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1039 days.

(21) Appl. No.: 10/386,482

(22) Filed: Mar. 13, 2003

(65) Prior Publication Data

US 2004/0051886 A1    Mar. 18, 2004

(30) Foreign Application Priority Data

Sep. 18, 2002    (JP)    ............................. 2002-271322

(51) Int. Cl.
*H04N 1/60*    (2006.01)
(52) U.S. Cl. ..................... 358/1.9; 358/515; 358/518
(58) Field of Classification Search ............... 358/529,
358/2.1, 1.9, 518, 520, 519, 521, 522, 504,
358/515, 530, 523, 501; 345/600
See application file for complete search history.

(56) References Cited

U.S. PATENT DOCUMENTS

| 4,989,079 | A | * | 1/1991 | Ito .............................. 358/520 |
| 5,329,385 | A | * | 7/1994 | Washio ........................ 358/515 |
| 5,894,358 | A |  | 4/1999 | Ebner et al. |
| 6,885,382 | B1 | * | 4/2005 | Matsuzaki et al. .......... 345/600 |
| 2001/0035968 | A1 | * | 11/2001 | Higashikata et al. .......... 358/1.9 |
| 2002/0060797 | A1 | * | 5/2002 | Namikata .................... 358/1.9 |

FOREIGN PATENT DOCUMENTS

| GB | 2 376 587 | 12/2002 |
| JP | A 5-292306 | 11/1993 |
| JP | A 6-242523 | 9/1994 |
| JP | A-09-261492 | 10/1997 |
| JP | A-2001-061076 | 3/2001 |
| JP | A-2002-010096 | 1/2002 |
| JP | A 2002-10096 | 1/2002 |

OTHER PUBLICATIONS

U.S. Appl. No. 10/267,649, filed Oct. 10, 2002, Sasaki et al.

* cited by examiner

*Primary Examiner*—King Y. Poon
*Assistant Examiner*—Allen H. Nguyen
(74) *Attorney, Agent, or Firm*—Oliff & Berridge, PLC (57) ABSTRACT

Receiving an object color signal and an input black colorant quantity associated with the object color signal, an equivalent output black colorant quantity calculating section calculates an equivalent output black colorant quantity in an output color space equivalent to the input black colorant quantity from the input black colorant quantity. An output color signal determining section calculates an output color signal from the object color signal and the equivalent input black colorant quantity, and determines whether or not the coverage restriction is satisfied. When the coverage restriction is not satisfied, an optimum black colorant quantity is calculated by adjusting the input black colorant quantity, and an optimum color signal satisfying the coverage restriction is calculated to generate an output color signal with the optimum black colorant quantity in the restriction black colorant quantity calculating section and subsequent processings.

31 Claims, 7 Drawing Sheets

COLOR PROCESSING METHOD, COLOR PROCESSING DEVICE, STORAGE MEDIUM, COLOR PROCESSING PROGRAM, AND IMAGE FORMING APPARATUS

The present disclosure relates to the subject matter contained in Japanese Patent Application No. 2002-271322 filed on Sep. 18, 2002, which is incorporated herein by reference in its entirety.

BACKGROUND OF THE INVENTION

1. Field of the Invention

The present invention relates to a technique for converting a color signal in an object color space such as L*a*b* or RGB, and a black colorant quantity associated with the color signal, into the color signal in an output color space containing the black colorant such as YMCK, or a technique for converting the color signal in the input col or space containing the black colorant such as YMCK into the color signal in the output color space containing the black colorant such as YMCK.

2. Description of the Related Art

In performing the color printing of a color image by electrophotography, four colors of yellow (Y), magenta (M), cyan (C) and black colorant (K) are normally used. A typical color signal lies on the three dimensional color space such as L*a*b*, L'u'v' color space independent of the device, or RGB color space for use with a monitor signal. Accordingly, it is required to convert a color signal on the three dimensional color space into the four dimensional color space in performing the color printing of the color image. However, this conversion occurs between different dimensions, not corresponding to one to one, in which the three-color color signal on the three dimensional color space and the four-color color signal on the four dimensional space that reproduces the three-color color signal are combined in plural ways.

There are two methods for deciding a combination between the three-color color signal on the three dimensional color space and the four-color color signal on the four dimensional color space, including calculating the black colorant quantity contained in the three-color color signal of Y, M and C, removing the under colors and adding the black colorant (K), and firstly deciding the black colorant (K) in some way, and deciding the quantity of Y, M and C in accordance with the black colorant (K) quantity.

For example, with a method as described in JP-A-Hei. 5-292306, first of all, the K quantity (achromatic black colbrant quantity) of the four-color color signal for reproducing an object color signal under the condition of Y=0%, M=0% or C=0% is weighted with a preset factor to decide a new K quantity. And the quantities of Y, M and C for reproducing the object color signal are decided in accordance with the K quantity. Thereby, the black colorant quantity can be controlled to realize the color reproduction at high precision while achieving the purpose.

Also, with a method as described in JP-A-Hei. 6-242523, first of all, the K quantity (maximum black colorant quantity) of the four-color color signal for reproducing an object color signal under the condition of Y=0%, M=0%, C=0% or K=100% is calculated. Also, the K quantity (minimum black colorant quantity) of the four-color color signal for reproducing the object color signal under the condition of Y=100%, M=100%, C=100% or K=0% is calculated. Employing the maximum and minimum black colorant quantities thus calculated, a new K quantity is decided with the preset parameters. And the new quantities of Y, M and C for reproducing the object color signal are decided in accordance with the K quantity. Thereby, it is possible to utilize the color gamut reproducible with four colors including the block colorant to the maximum.

Herein, a condition called a coverage restriction is imposed on the general output device. The coverage restriction is an upper limit for the total quantity of recording material such as the toner or black colorant for use in reproducing the color signal. Mainly, the coverage restriction is imposed to avoid a degradation in the reproduction performance or an upsurge on the print surface due to excessive use of the recording material such as the toner or black colorant, or protect the output device.

With the conventional method as above described, since no coverage restriction is considered, when the black colorant quantity is controlled with the preset parameters, the color signal may not be reproduced irrespective of reproducible color gamut. That is, if the color signal is recorded with the calculated values of Y, M, C and K, the color gamut is consequently compressed due to a degradation in the reproduction performance, resulting in a problem that the color reproducibility is degraded.

In order to solve the above-mentioned problem, in JP-A-2002-010096 (US2001/0035968A1), the optimum black colorant quantity is calculated in the color gamut reproducible of three colors, the outermost contour of four color gamut satisfying the coverage restriction is searched from outside the color gamut reproducible of three colors, and the black colorant quantity K is decided using the black colorant quantity on the outermost contour and the optimum black colorant quantity calculated previously. Employing the black colorant quantity K calculated in this manner, a combination of Y, M, C and K satisfying the coverage restriction can be obtained.

Generally, the optimum black colorant quantity is designed smaller when the chroma component of the object color signal increases. Because a natural color reproduction is made by reducing the black colorant quantity with the increasing chroma component. However, with the method as described in JP-A-2002-010096 (US2001/0035968A1), the maximum black colorant quantity is obtained as the black colorant quantity in the outermost contour of color gamut satisfying the coverage restriction, although the black colorant quantity within the three color gamut is adjusted in the above manner. Therefore, in the achromatic color, the coverage restriction is satisfied by the calculated Y, M, C and K, and the color gamut is fully utilized, but the black colorant quantity must be increased with the increasing chroma component, so that the reproduced color signal is unnatural.

However, this conventional method involves deciding the optimum black colorant quantity satisfying the coverage restriction from the color signal in the object color space where the black colorant quantity is not given, but is not a technique in which the black colorant quantity is given in advance as the input. When the black colorant quantity is given in advance, it is desired that the black colorant quantity satisfying the coverage restriction and other color signal are decided to preserve the given black colorant quantity if possible.

A simple color processing method in which the black colorant quantity is given involves calculating the four-color color signal containing the black colorant, using the given black colorant quantity without adjustment from the color signal in the object color space, and simply preserving the ratio for four-color color signal within the coverage restriction. In this case, however, because all the four colors containing the black colorant are reduced within the coverage restriction, the black colorant quantity is not equivalent to the given black colorant quantity. Also, there is a large color difference from the given color signal, causing a problem that a color shade occurs in a dark part where the total quantity of coverage is greatly employed.

Therefore, with the conventional method, in converting the four-color color signal in the color space containing the black colorant into the color signal in the color space containing other black colorant, it was difficult to generate the color signal satisfying the coverage restriction, when realizing the colorimetric coincidence where black colorant quantities are equivalent if possible.

SUMMARY OF THE INVENTION

This invention has been achieved in the light of the above-mentioned problems. It is an object of the invention to provide a color processing method and device for generating a color signal in an output color space capable of a natural color reproduction and satisfying the coverage restriction, while preserving the given black colorant quantity if possible, when converting the color signal in the object color space such as L*a*b* or RGB and a given black colorant quantity, or the color signal in an input color space containing the black colorant such as YMCK into the color signal in the output color space containing the black colorant such as YMCK. Moreover, it is another object of the invention to provide a program for performing the color processing method on the computer, a storage medium storing the program, and an image forming apparatus having a section for performing the color processing method and mounting the color processing device.

According to a first aspect of the invention, there is provided a color processing method for generating an output color signal containing a black colorant in an output color space from an object color signal in an object color space and an input black colorant quantity associated with the object color signal. The color processing method includes calculating an equivalent output black colorant quantity in the output color space from the input black colorant quantity, the equivalent output black colorant quantity equivalent to the input black colorant quantity, determining as to whether a first color signal in the output color space satisfies a coverage restriction, the first color signal calculated from the object color signal and the equivalent output black colorant quantity, calculating an optimum black colorant quantity so that a second color signal in the output color space, which is calculated from the object color signal and the equivalent output black colorant quantity and has the optimum black colorant quantity, satisfies the coverage restriction, when it is determined that the first color signal does not satisfy the coverage restriction, and calculating an optimum color signal corresponding to the optimum black colorant quantity. The color processing method may further include calculating an optimum output color signal having the optimum black colorant quantity from the optimum black colorant quantity and the optimum color signal, the optimum output color signal satisfying the coverage restriction.

According to a second aspect of the invention, there is provided a color processing method for generating an output color signal containing a black colorant in an output color space from an input color signal containing the black colorant in an input color space. The color processing method includes calculating an object color signal from the input color signal, the object color signal being a color signal in a color space independent of a device, calculating an equivalent output black colorant quantity equivalent to a black colorant quantity of the input color signal, calculating a first color signal in the output color space from the object color signal and the equivalent output black colorant quantity, determining as to whether the first color signal satisfies a coverage restriction, calculating an optimum black colorant quantity so that a second color signal in the output color space, which is calculated from the object color signal and the equivalent output black colorant quantity and has the optimum black colorant quantity, satisfies the coverage restriction, when it is determined that the first color signal does not satisfy the coverage restriction, and calculating an optimum color signal corresponding to the optimum black colorant quantity. The color processing method may include calculating an optimum output color signal having the optimum black colorant quantity from the optimum black colorant quantity and the optimum color signal, the optimum output color signal satisfying the coverage restriction.

In this manner, in the invention, the output color signal is generated, with the input black colorant quantity or the black colorant quantity in the input color space preserved, if the coverage restriction is satisfied, or the black colorant quantity is adjusted inevitably, if the coverage restriction is not satisfied. Thereby, the output color signal satisfying the coverage restriction with the given black colorant quantity preserved if possible is generated, whereby the excellent and natural color reproduction is made.

The optimum black colorant quantity may be calculated by weighed average of a restriction black colorant quantity and the equivalent output black colorant quantity. The restriction black colorant quantity is a minimum black colorant quantity of the object color signal satisfying the coverage restriction. A third color signal is calculated from the object color signal and a maximum black colorant quantity of color signals in the output color space for reproducing the object color signal. When the third color signal in the output color space satisfies the coverage restriction, the restriction black colorant quantity may be calculated by searching between the maximum black colorant quantity and the equivalent output black colorant quantity so that a sum of the restriction black colorant quantity and a fourth color signal in the output color space satisfies the coverage restriction, the fourth color signal calculated from the restriction black colorant quantity and the object color signal, except for the restriction black colorant quantity. When the third color signal does not satisfy the coverage restriction and among the color signals, which are searched with starting from the object color signal as a start point in a predetermined compression direction, a fifth color signal in the output color space calculated from the searched color signal and the maximum black colorant quantity of the searched color signal satisfies the coverage restriction and the searched color signal is most closest to the object color signal, a adjusted color signal may be the searched color signal and the restriction black colorant quantity may be a maximum black colorant quantity of the adjusted color signal. Incidentally, the weighted average may use a ratio depending on at least one of brightness, chroma, and hue calculated from one of the object color signal and the adjusted color signal. In addition, the optimum color signal may be a color signal closest to one of the object color signal and the adjusted color signal among color signals, which searched in the predetermined compression direction from the one of the object color signal and the adjusted color signal as a start so that a sixth color signal calculated from the optimum color signal and the optimum black colorant quantity satisfies the coverage restriction. Also, the predetermined compression direction may be a direction toward one of a fixed point of an achromatic color and a fixed point in the neighbor of the achromatic color.

The color processing device may comprise a user interface for appropriately selecting or inputting a transformation definition or a measured value for specifying the color gamut of the input color space, a transformation definition or a measured value for specifying the color gamut of the output color space and the coverage restricted value. The user interface does not accept the input coverage restricted value, if the coverage restricted value input by the user via the user interface is out of a proper range.

Moreover, the invention provides a computer readable storage medium, characterized by storing a program for enabling a computer to perform the color processing method. Also, the invention provides a color processing program characterized by enabling a computer to perform the color processing method, or implement the functions of the color processing device.

Further, the invention provides an image forming apparatus for forming on a recording medium an image represented by an object color signal that is any color signal in an object color space and an input black colorant quantity associated with the object color signal, or an image represented by an input color signal in an input color space containing the black colorant, characterized by comprising color processing means for implementing the color processing method according to the invention or the color processing device of the invention, and image forming means for forming on the recording medium the image in accordance with an output color signal generated by the color processing means or the color processing device. As above described, in the color processing means or the color processing device, the color processing is made with the coverage restriction satisfied, while the given black colorant quantity is preserved, if possible, whereby the image is output with the excellent color reproduction by the image forming means

DETAILED DESCRIPTION OF THE PREFERRED EMBODIMENTS

First Embodiment

Figure 1:
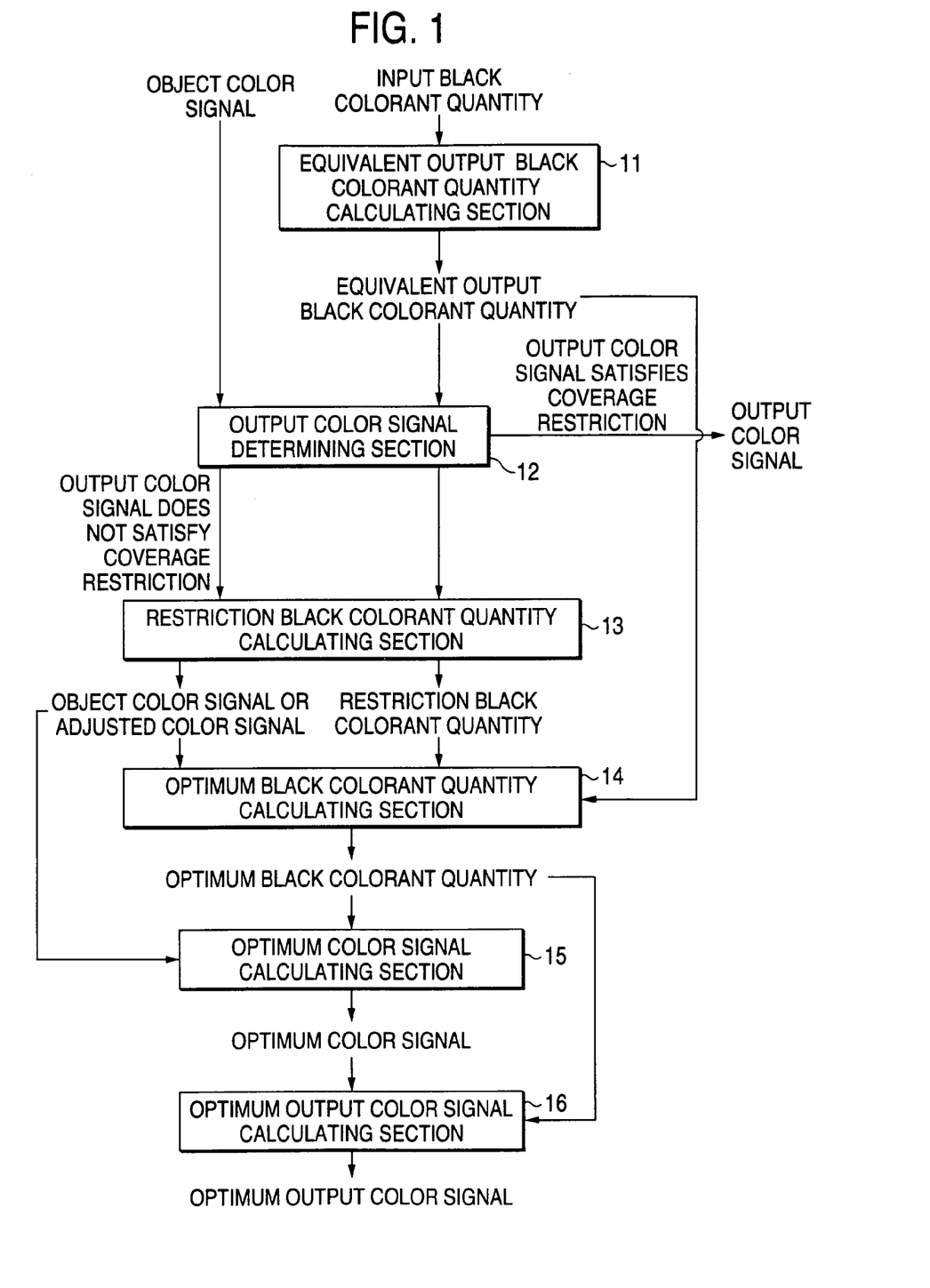
FIG. 1 is a block diagram showing the first embodiment of a color processing device and method according to the present invention.

FIG. 1 is a block diagram showing a color processing device and method according to a first embodiment of the present invention. In FIG. 1, 11 denotes an equivalent output black colorant quantity calculating section, 12 denotes an output color signal determining section, 13 denotes a restriction black colorant quantity calculating section, 14 denotes an optimum black colorant quantity calculating section, 15 denotes an optimum color signal calculating section, and 16 denotes an optimum output color signal calculating section. In the first embodiment, a color signal in an object color space such as $L^*a^*b^*$ and RGB and the input black colorant quantity associated with the color signal are given, and a color signal in an output color space containing the black colorant such as YMCK is output.

Figure 2:
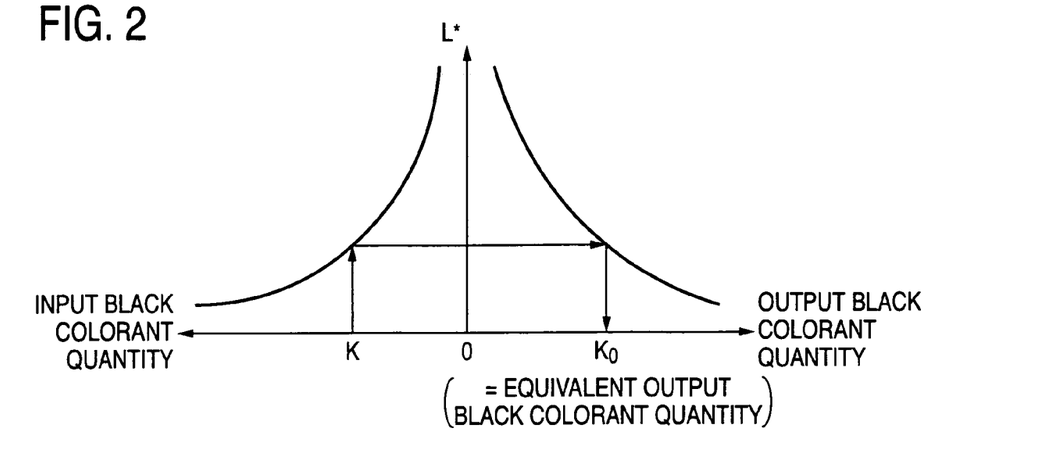
FIG. 2 is a graph for explaining a method for calculating the equivalent output black colorant quantity.

The equivalent output black colorant quantity calculating section 11 calculates an equivalent output black colorant quantity, which is black colorant quantity in the output color space equivalent to the input black colorant quantity. The calculation of this equivalent output black colorant quantity may be made by observing the brightness of the input black colorant quantity and calculating the black colorant quantity in the output color space. FIG. 2 is a graph for explaining a method for calculating the equivalent output black colorant quantity. A relationship between the black colorant quantity and the brightness in the input color space is shown on the left side of the $L^*$ axis in the figure. A relationship between the black colorant quantity and the brightness in the output color space is shown on the right side of the $L^*$ axis. The brightness in the input color space is obtained from the input black colorant quantity K. Then, a black colorant quantity (equivalent output black colorant quantity) K0 in the output color space having the same brightness as the obtained brightness is obtained. Thereby, the black colorant quantity is preserved between an input side device (input color space) and an output side device (output color space).

The output color signal determining section 12 calculates a color signal containing the black colorant in the output color space. This calculation is made by giving the object color signal and the equivalent output black colorant quantity to a statistical method such as a linear regressive analysis, or a color transfer characteristic predictive model made up of a neural network. Then, a determination is made whether or not the obtained color signal in the output color space satisfies the coverage restriction. If the coverage restriction is satisfied, the obtained color signal in the output color space is output directly as the output color signal. Thereby, the output color signal with the input black colorant quantity preserved can be output. Alternatively, if the coverage restriction is not satisfied, the object color signal and the equivalent output black colorant quantity are passed to the restriction black colorant quantity calculating section 13 to further make the color processing.

When the color signal in the output color space corresponding to the object color signal and the input black colorant quantity does not satisfy the coverage restriction, the restriction black colorant quantity calculating section 13 and subsequent sections adjust the object color signal and the input black colorant quantity (equivalent output black colorant quantity) so as to preserve the input black colorant quantity as much as possible, and generate an output color signal satisfying the coverage restriction.

The restriction black colorant quantity calculating section 13 calculates the restriction black colorant quantity, which is the black colorant quantity required at minimum to satisfy the coverage restriction, using the object color signal. The restriction black colorant quantity can be fundamentally obtained by making a search between the maximum black colorant quantity indicating the black colorant quantity when the black colorant quantity is largest among the color signals containing the black colorant, and the equivalent output black colorant quantity. The search is made by using any existing search method such as a binary search.

Figure 3:
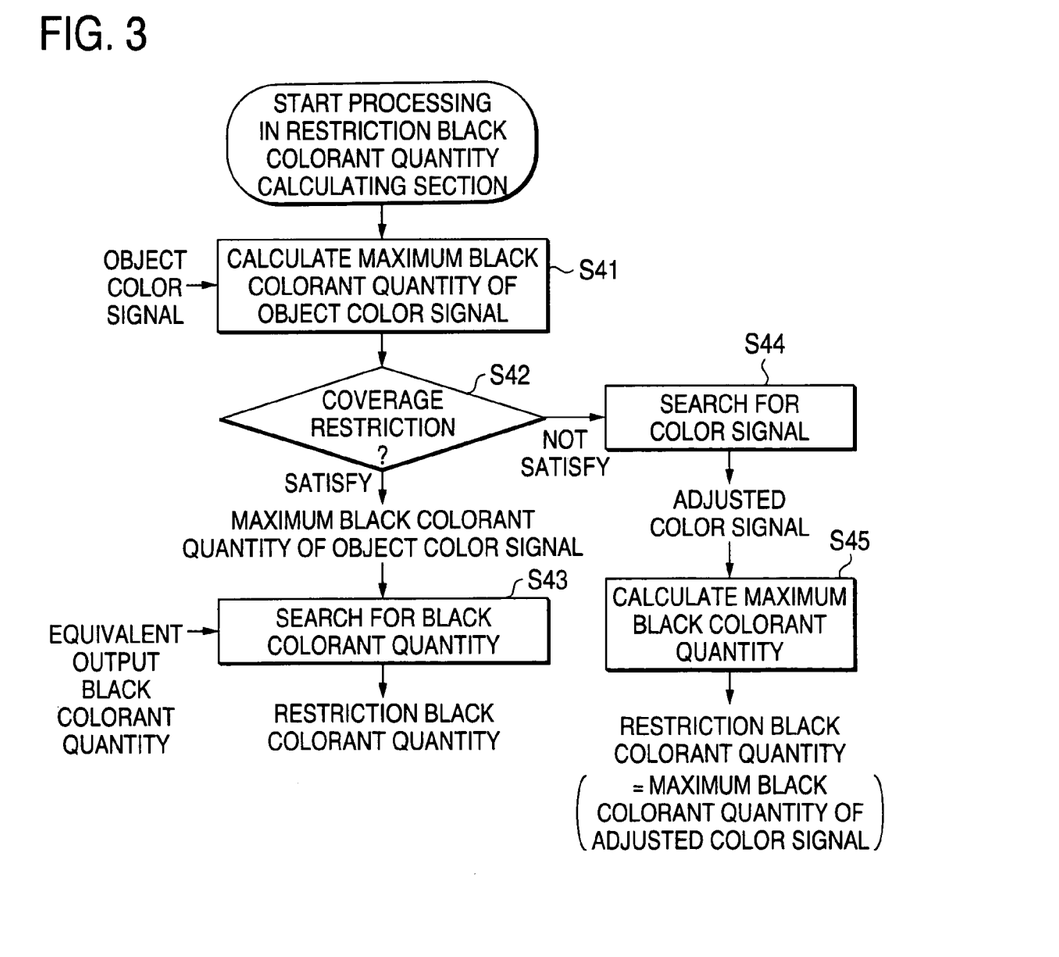
FIG. 3 is a flowchart showing an example of the operation in a restriction black colorant quantity calculating section.

FIG. 3 is a flowchart showing an example of the operation in the restriction black colorant quantity calculating section. Generally, when the black colorant quantity is increased, other color signals can be reduced, so that a sum of color signals can be reduced. Accordingly, the black colorant quantity satisfying the coverage restriction can be obtained in most cases by increasing the black colorant quantity, even if the coverage restriction is not satisfied in the equivalent output black colorant quantity. However, the coverage restriction may not be satisfied in some cases even by using the maximum black colorant quantity. An example of the operation of the restriction black colorant quantity calculating section 13 with taking such cases into consideration is shown in FIG. 3.

At step S41, the maximum black colorant quantity in the object color signal is calculated. Then, at step S42, the color signal in the output color space is calculated from the maximum black colorant quantity and the object color signal, and a determination is made whether or not the calculated color signal satisfies the coverage restriction. The maximum black colorant quantity calculated at step S41 is different from the equivalent output black colorant quantity corresponding to the object color signal. Therefore, it is necessary to determine whether or not the color signal calculated by the object color signal and the maximum black colorant quantity satisfies the coverage restriction separately, even if the output color signal calculated by the object color signal and the equivalent output black colorant quantity does not satisfy the coverage restriction.

When the coverage restriction is satisfied, the restriction black colorant quantity exists between the equivalent output black colorant quantity where the coverage restriction is not satisfied and the maximum black colorant quantity where the coverage restriction is satisfied. Accordingly, at step S43, the restriction black colorant quantity is searched between the maximum black colorant quantity and the equivalent output black colorant quantity. For example, the restriction black colorant quantity is calculated by searching the restriction black colorant quantity so that a sum of the restriction black colorant quantity and the color signal except for the restriction black colorant quantity in the output color space, calculated from the restriction black colorant quantity and the object color signal, satisfy the coverage restriction. Specifically, in the search process, CMY and $K_T$ are predicted based on Lab and $K_T$ repeatedly (assuming that the restriction black colorant quantity is expressed as $K_T$, that the object color signal is expressed as Lab, that the color signal except for $K_T$ calculated from the $K_T$ and Lab is expressed as YMC). It should be noted that an amount of a sum of C (cyan), M(magenta), Y(yellow), and $K_T$ during the search process does not satisfy the coverage restriction until the coverage restriction is satisfied.

If it is determined that the coverage restriction is not satisfied at step S42, it is indicated that the black colorant quantity is insufficient even with the maximum black colorant quantity. However, since the black colorant quantity can not be increased anymore in the object color signal, the object color signal itself is adjusted so that the maximum black colorant quantity satisfies the coverage restriction to calculate an adjusted color signal at step S44. For example, when among the color signals, which are searched with starting from the object color signal as a start point in a predetermined compression direction, a color signal in the output color space calculated from the searched color signal and the maximum black colorant quantity of the searched color signal satisfies the coverage restriction and the searched color signal is most closest to the object color signal, the adjusted color signal maybe the searched color signal. Incidentally, the compression direction may be a direction toward achromatic color or a fixed point in the neighbor of achromatic color. Here, the neighbor of achromatic color may be in a range of gray, for example, YMC=0 to 100 (process gray) and/or K=0 to 100 (monochromatic gray). The maximum black colorant quantity in the adjusted color signal obtained at step S44 may be set as the restriction black colorant quantity at step S45.

In this manner, in the restriction black colorant quantity calculating section 13, if the maximum black colorant quantity obtained from the object color signal satisfies the coverage restriction, the restriction black colorant quantity is searched between the maximum black colorant quantity and the equivalent output black colorant quantity without adjusting the color signal. On the other hand, if the maximum black colorant quantity obtained from the object color signal does not satisfy the coverage restriction, the adjusted color signal is calculated by adjusting the object color signal itself so that the maximum black colorant quantity satisfies the coverage restriction, and the maximum black colorant quantity at that time is set as the restriction black colorant quantity.

Returning to FIG. 1, the optimum black colorant quantity calculating section 14 calculates the optimum black colorant quantity, using the restriction black colorant quantity and the equivalent output black colorant quantity. If the restriction black colorant quantity is directly used in a high chroma area, the color reproduction is unnatural. Therefore, in this embodiment, a weighted average of the restriction black colorant quantity and the equivalent output black colorant quantity is obtained to calculate the optimum black colorant quantity.

Figure 4:
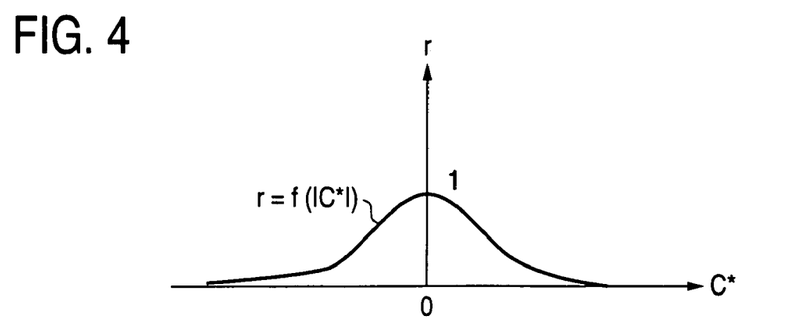
FIG. 4 is a graph showing a weighting function for use in calculating the optimum black colorant quantity in an optimum black colorant quantity calculating section.

The weighted average may use a ratio of weights depending on at least one of the brightness, chroma and hue calculated from the object color signal or the adjusted color signal. FIG. 4 is a graph showing a weighting function used in calculating the optimum black colorant quantity in the optimum black colorant quantity calculating section 14. In an example of FIG. 4, the function indicates a relationship between the chroma C* and the ratio r. In this example, the ratio of restriction black colorant quantity is designed to be largest in the achromatic color.

Assuming that K0 is the equivalent output black colorant quantity, $K_T$ is the restriction black colorant quantity, and $K_{OPT}$ is the optimum black colorant quantity, $K_{OPT}$ is calculated such as, $$K_{OPT}=K0+r(K_T-K0)$$

Where r is a constant for adjusting proportion between the restriction black colorant quantity and the equivalent output black colorant quantity, and is decided using the function as shown in FIG. 3. For example, this function is defined as $$r=f(|C^*|)=1/\{1+(|C^*|/C0)^\alpha\}$$

where C* is the chroma of color signal. Herein, C0 is an inflection point of the function f, and α is a parameter for deciding the maximum gradient of the function. C0 and α can be adjusted in accordance with a device.

Employing such a weighting function, the equivalent output black colorant quantity is used as much as possible in a large chroma area so that the clear color reproduction is maintained. Also, in an area where the chroma is small and the greatest coverage is used, the given color signal is faithfully reproduced by increasing the black colorant quantity, whereby the excellent color reproduction is made without color shade in the dark color area.

The calculation of this optimum black colorant quantity solves the problem that the color reproduction is unnatural in the high chroma area due to excessive black colorant quantity. If the above calculation is made when the input black colorant quantity is greater than the restriction black colorant quantity, the optimum black colorant quantity becomes greater than the restriction black colorant quantity, impeding the excellent color reproduction. Therefore, when the input black colorant quantity is greater than the restriction black colorant quantity, the optimum black colorant quantity may be the restriction black colorant quantity (r=1).

In the optimum color signal calculating section 15, the optimum color signal is searched so that the optimum black colorant quantity calculated by the optimum black colorant quantity calculating section 14 satisfies the coverage restriction. For example, when the optimum black colorant quantity is less than the restriction black colorant quantity in the optimum black colorant quantity calculating section 14, the coverage restriction is not satisfied directly. In this optimum color signal calculating section 15, the optimum color signal satisfying the coverage restriction is obtained with the optimum black colorant quantity fixed, and by adjusting other color signals. The search for the optimum color signal may be made in a predetermined compression direction, using the optimum black colorant quantity, from the object color signal or adjusted color signal as the start point. The optimum color signal may be a color signal closest to the object color signal or adjusted color signal among the color signals satisfying the coverage restriction. The compression direction may be a direction toward a fixed point at or near achromatic color. Also, the search is made using a binary search, for example.

Figure 5:
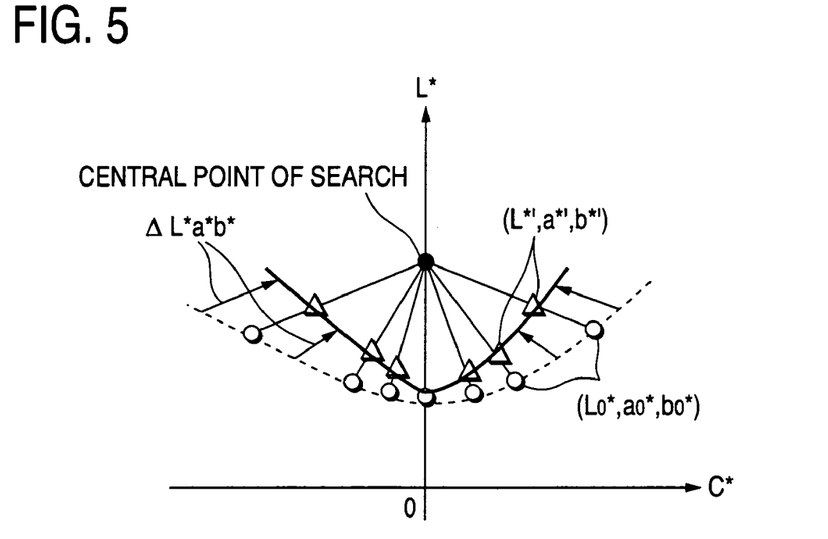
FIG. 5 is a graph showing a searching process for an optimum color signal in an optimum color signal calculating section.

FIG. 5 is a graph showing a searching process for an optimum color signal in the optimum color signal calculating section 15. In an example of FIG. 5, a white circle indicates (L*0, a*0, b*0), which is the given object color signal or adjusted color signal. A white triangle indicates the optimum color signal (L*, a*, b*) searched to satisfy the coverage restriction. Length of an arrow representing ΔL*a*b* indicates an amount of movement from the given color signal to the optimum color signal. Also, a black circle indicates a central point of search. FIG. 5 shows an example in which the search is made toward this central point of search.

Herein, if the optimum color signal is searched with the optimum black colorant quantity fixed, the maximum black colorant quantity is changed in accordance with a change in the color signal, so that the optimum black colorant quantity may exceed the maximum black colorant quantity in the optimum color signal satisfying the coverage restriction (in other words, the maximum black colorant quantity is changed to be less than the optimum black colorant quantity). In this case, the optimum black colorant quantity is searched as the maximum black colorant quantity of the color signal during the search process.

Also, when the optimum black colorant quantity is less than the minimum black colorant quantity, which is minimum black colorant quantity as required to reproduce the four-color color signal, the color signal is outside the color gamut. In this case, the search is made between the given object color signal or adjusted color signal and the central point of search until the optimum black colorant quantity exceeds the minimum black colorant quantity for the color signal during the search process.

Referring to FIGS. 6 to 10, the process for acquiring the optimum black colorant quantity and the optimum color signal will be described below for each case with the relationship among the equivalent output black colorant quantity, the maximum black colorant quantity, and the restriction black colorant quantity and the like. In FIGS. 6 to 10, K0 is the equivalent output black colorant quantity, $K_T$ is the restriction black colorant quantity, and $K_{OPT}$ is the optimum black colorant quantity. The transverse axis thereof represents the amount of movement ΔL*a*b* of L*a*b* from the object color signal or adjusted color signal. The longitudinal axis thereof represents the black colorant quantity. Also, a solid line indicates a locus of the maximum black colorant quantity.

Figure 6:
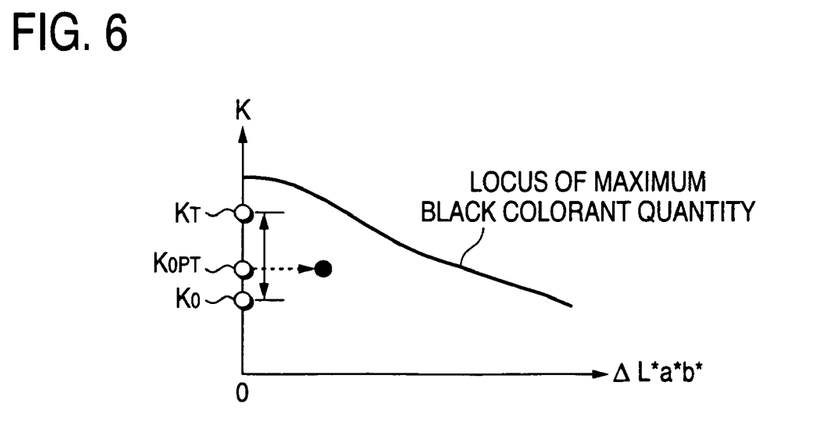
FIG. 6 is a graph showing a process for obtaining the optimum color signal and the optimum black colorant quantity, when the maximum black colorant quantity in the object color signal satisfies the coverage restriction.

FIG. 6 is a graph showing a process for obtaining the optimum color signal and the optimum black colorant quantity, when the maximum black colorant quantity in the object color signal satisfies the coverage restriction. First of all, in the restriction black colorant quantity calculating section 13, the restriction black colorant quantity $K_T$ is calculated without changing the object color signal. In the graph as shown in FIG. 6, the restriction black colorant quantity $K_T$ is calculated at the amount of movement ΔL*a*b*=0, namely, on the K axis. Herein, it is assumed that the coverage restriction is satisfied at the maximum black colorant quantity in the object color signal. Therefore, the restriction black colorant quantity $K_T$ is obtained by searching between the maximum black colorant quantity on the K axis and the equivalent output black colorant quantity K0.

Then, in the optimum black colorant quantity calculating section 14, the optimum black colorant quantity $K_{OPT}$ is calculated between the restriction black colorant quantity $K_T$ and the equivalent output black colorant quantity K0 (in a range as indicated by arrows in the figure). Since this optimum black colorant quantity $K_{OPT}$ is less than the restriction black colorant quantity $K_T$, the optimum black colorant quantity $K_{OPT}$ does not satisfy the coverage restriction. Therefore, the optimum color signal calculating section 15 adjusts the object color signal. That is, the object color signal is moved in a direction where the amount of movement $\Delta L^*a^*b^*$ is increased as indicated by a broken line in FIG. 6, until the coverage restriction is satisfied. In this manner, the optimum color signal as indicated by the black circle is obtained. This optimum color signal and the optimum black colorant quantity may be output as the output color signal.

Figure 7:
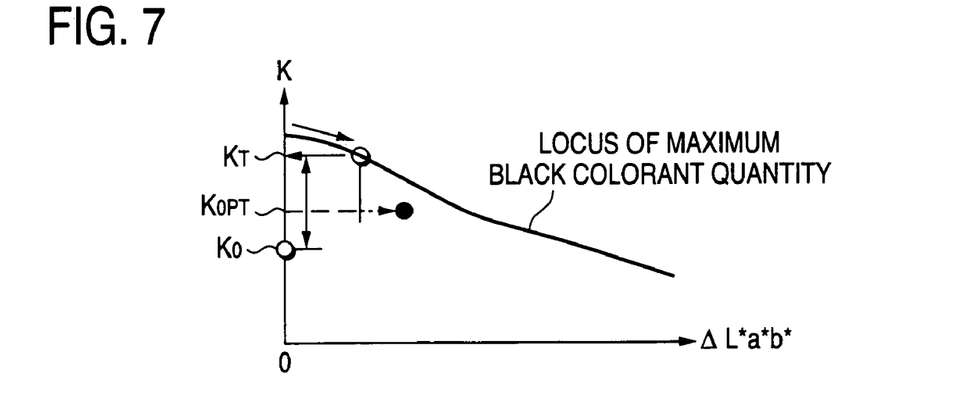
FIG. 7 is a graph showing a process for obtaining the optimum color signal and the optimum black colorant quantity, when the maximum black colorant quantity in the object color signal does not satisfy the coverage restriction.

FIG. 7 is a graph showing a process for obtaining the optimum color signal and the optimum black colorant quantity, when the maximum black colorant quantity in the object color signal does not satisfy the coverage restriction. First of all, in the restriction black colorant quantity calculating section 13, the restriction black colorant quantity $K_T$ is calculated. However, if the maximum black colorant quantity in the object color signal does not satisfy the coverage restriction, the adjusted color signal is searched at step S44 in FIG. 3 so that the maximum black colorant quantity satisfies the coverage restriction. That is, the object color signal is moved along a locus of the maximum black colorant quantity as indicated by an arrow in FIG. 7, until the maximum black colorant quantity satisfies the coverage restriction. The maximum black colorant quantity obtained in this manner is the restriction black colorant quantity $K_T$.

Then, in the optimum black colorant quantity calculating section 14, the optimum black colorant quantity $K_{OPT}$ is calculated between the restriction black colorant quantity $K_T$ and the equivalent output black colorant quantity K0 (in a range as indicated by arrows in the figure). Then, the object color signal is adjusted in the optimum color signal calculating section 15. At this time, the adjusted color signal is set at the start point. That is, the object color signal is moved from the adjusted color signal obtained in calculating the restriction black colorant quantity $K_T$ in a direction where the amount of movement $\Delta L^*a^*b^*$ is increased as indicated by an arrow of a broken line in FIG. 7, until the coverage restriction is satisfied. In this manner, the optimum color signal as indicated by the black circle is obtained. This optimum color signal and the optimum black colorant quantity may be output as the output color signal.

Figure 8:
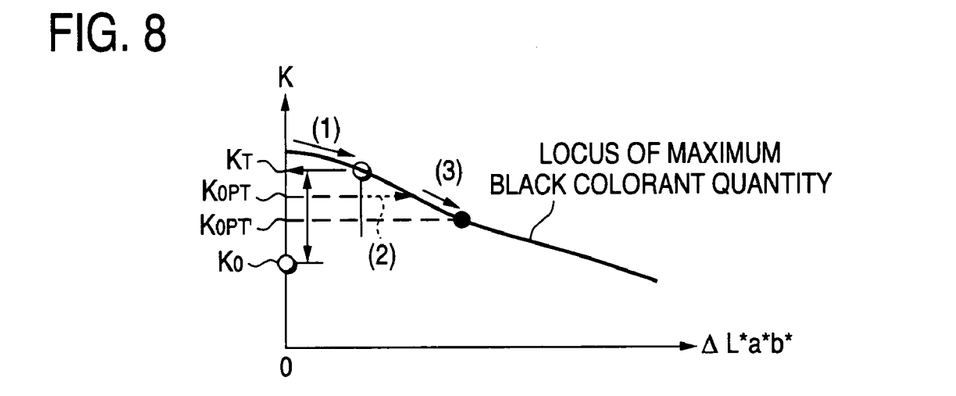
FIG. 8 is a graph showing a process for obtaining the optimum color signal and the optimum black colorant quantity, when the maximum black colorant quantity in the object color signal does not satisfy the coverage restriction, and the optimum black colorant quantity exceeds the maximum black colorant quantity in the optimum color signal in the searching process.

FIG. 8 is a graph showing a process for obtaining the optimum color signal and the optimum black colorant quantity, when the maximum black colorant quantity in the object color signal does not satisfy the coverage restriction and the optimum black colorant quantity exceeds the maximum black colorant quantity in the optimum color signal during the searching process. Since the maximum black colorant quantity in the object color signal does not satisfy the coverage restriction in calculating the restriction black colorant quantity $K_T$ in the restriction black colorant quantity calculating section 13, the adjusted color signal is searched so that the maximum black colorant quantity satisfies the coverage restriction as with the example of FIG. 7. That is, the object color signal is moved along a locus of the maximum black colorant quantity as indicated by an arrow (1) as shown in FIG. 8, until the maximum black colorant quantity satisfies the coverage restriction. The maximum black colorant quantity obtained in this manner is the restriction black colorant quantity $K_T$.

Then, in the optimum black colorant quantity calculating section 14, the optimum black colorant quantity $K_{OPT}$ is calculated between the restriction black colorant quantity $K_T$ and the equivalent output black colorant quantity K0 (in a range as indicated by arrows in the figure). Then, the object color signal is adjusted in the optimum color signal calculating section 15 so that the adjusted color signal is set at the start point. That is, the object color signal is moved from the adjusted color signal obtained in calculating the restriction black colorant quantity $K_T$ in a direction where the amount of movement $\Delta L^*a^*b^*$ is increased as indicated by an arrow (2) of a broken line in FIG. 8. However, if the amount of movement $\Delta L^*a^*b^*$ is increased with the optimum black colorant quantity $K_{OPT}$ not changed, the optimum black colorant quantity $K_{OPT}$ exceeds the maximum black colorant quantity in this example. That is, the broken line of (2) crosses the maximum black colorant quantity as indicated by the solid line in the example of FIG. 8. In this case, the search is continued with the optimum black colorant quantity set as the maximum black colorant quantity of the color signal during the search process. That is, the optimum color signal is searched along a locus as indicated by an arrow (3) of a broken line in the example as shown in FIG. 8. In this manner, the optimum color signal as indicated by the black circle is obtained. Also, the maximum black colorant quantity in this optimum color signal is made the optimum black colorant quantity $K_{OPT}'$, and the optimum black colorant quantity $K_{OPT}'$ is output along with the optimum color signal as the output color signal.

Figure 9:
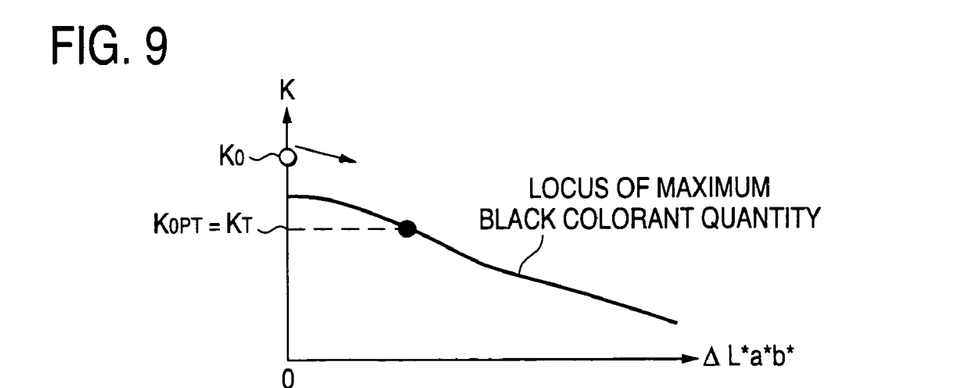
FIG. 9 is a graph showing a process for obtaining the optimum color signal and the optimum black colorant quantity when the equivalent output black colorant quantity exceeds the maximum black colorant quantity in the object color signal.

FIG. 9 is a graph showing a process for obtaining the optimum color signal and the optimum black colorant quantity when the equivalent output black colorant quantity exceeds the maximum black colorant quantity in the object color signal. If the equivalent output black colorant quantity K0 exceeds the maximum black colorant quantity in the object color signal, the adjusted color signal is searched so that the maximum black colorant quantity satisfies the coverage restriction as with the examples of FIGS. 7 and 8. That is, the object color signal is moved along a locus of the maximum black colorant quantity as indicated by an arrow in FIG. 9, until the maximum black colorant quantity satisfies the coverage restriction. The maximum black colorant quantity obtained in this manner is the restriction black colorant quantity $K_T$.

Then, in the optimum black colorant quantity calculating section 14, the optimum black colorant quantity is obtained. Since the equivalent output black colorant quantity K0 is greater than the restriction black colorant quantity $K_T$, the restriction black colorant quantity $K_T$ is the optimum black colorant quantity $K_{OPT}$. In this case, since the adjusted color signal in calculating the restriction black colorant quantity $K_T$ satisfies the coverage restriction, the adjusted color signal is employed directly as the optimum color signal, when the restriction black colorant quantity $K_T$ is the optimum black colorant quantity $K_{OPT}$. That is, the adjusted color signal and the restriction black colorant quantity $K_T$ are the optimum color signal and the optimum black colorant quantity $K_{OPT}$, respectively and may be output as the output color signal.

Figure 10:
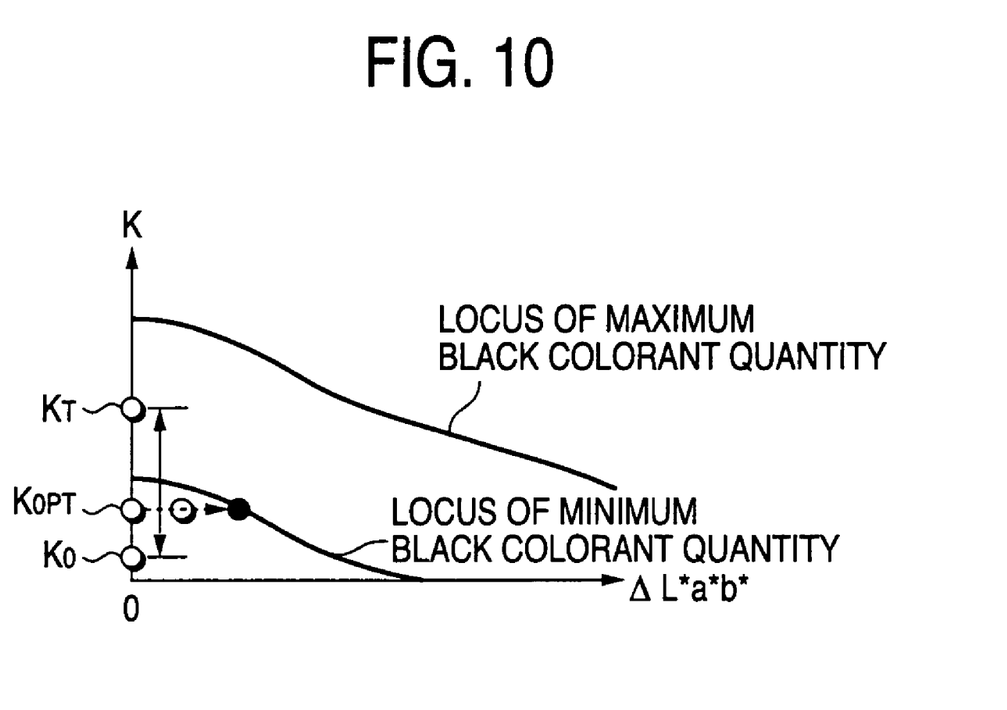
FIG. 10 is a graph showing a process for obtaining the optimum color signal and the optimum black colorant quantity when the optimum black colorant quantity falls below the minimum black colorant quantity in the object color signal.

FIG. 10 is a graph showing a process for obtaining the optimum color signal and the optimum black colorant quantity when the optimum black colorant quantity falls below the minimum black colorant quantity in the object color signal. Herein, assuming that the maximum black colorant quantity in the object color signal satisfies the coverage restriction. The restriction black colorant quantity calculating section 13 searches for the restriction black colorant quantity $K_T$ between the maximum black colorant quantity on the K axis and the equivalent output black colorant quantity K0, as described with reference to with FIG. 6. Then, the optimum black colorant quantity calculating section 14 calculates the optimum black colorant quantity $K_{OPT}$ between the restriction black colorant quantity $K_T$ and the equivalent output black colorant quantity K0 (in a range as indicated by arrows in FIG. 10).

Since this optimum black colorant quantity $K_{OPT}$ is less than the restriction black colorant quantity $K_T$, the optimum black colorant quantity $K_{OPT}$ does not satisfy the coverage restriction. Therefore, the object color signal is adjusted by the optimum color signal calculating section 15. However, even if the color signal satisfying the coverage restriction is obtained, the minimum black colorant quantity in that color signal must be satisfied. Therefore, the color signal is moved until the coverage restriction is satisfied and the optimum black colorant quantity $K_{OPT}$ is greater than or equal to the minimum black colorant quantity. In the example of FIG. 10, the optimum color signal is obtained at a point where the minimum black colorant quantity and the optimum black colorant quantity $K_{OPT}$ are crossed. If the coverage restriction is not satisfied at this crossed point, the optimum color signal is obtained by further moving the color signal as with the example of FIG. 6.

Herein, the maximum black colorant quantity in the object color signal satisfies the coverage restriction. However, if the maximum quantity in the object color signal does not satisfy the coverage restriction, the optimum black colorant quantity $K_{OPT}$ is obtained in the same manner as described with reference to FIG. 7. The above determination for the minimum black colorant quantity may be made in searching from the adjusted color signal.

Finally, the optimum output signal calculating section 16 calculates the optimum output color signal satisfying the coverage restriction in the output color space from the optimum black colorant quantity obtained by the optimum black colorant quantity calculating section 14 and the optimum color signal calculated by the optimum color signal calculating section 15. In this manner, the coverage restriction is satisfied in any case. The optimum black colorant quantity is decided to make more natural color reproduction. Furthermore, the optimum output color signal satisfying all the conditions can be obtained in view of the maximum black colorant quantity and the minimum black colorant quantity. Thereby, even if the coverage restriction is not satisfied in the input black colorant quantity, the natural, preferable color reproduction can be realized. The optimum output color signal calculating section 16 may not be provided.

In the above description for FIGS. 6 to 10, the process in the L*a*b* color space that is the color space of the object color signal is exemplified by taking the amount of movement ΔL*a*b* along the transverse axis. Accordingly, the color signal in the object color space is obtained as the optimum color signal. However, the color signal in the output color space is calculated in determining whether or not the coverage restriction is satisfied, whereby the optimum color signal in the output color space may be output. For example, when the output color signal is obtained along with the optimum black colorant quantity, the optimum color signal in the output color space should be output, in which it is presupposed in the above description that the optimum color signal in the output color space is output. This invention is not limited to thereto, but may be employed in various uses, including checking whether or not the object color signal (and the input black colorant quantity) satisfies the coverage restriction, and correcting for the object color signal. For such purposes, the optimum color signal in the object color space should be output. In this case, when the process is ended in the output color signal determining section 12, it is output that the coverage restriction is satisfied, or the object color signal and the equivalent output black colorant quantity may be output.

Second Embodiment

Figure 11:
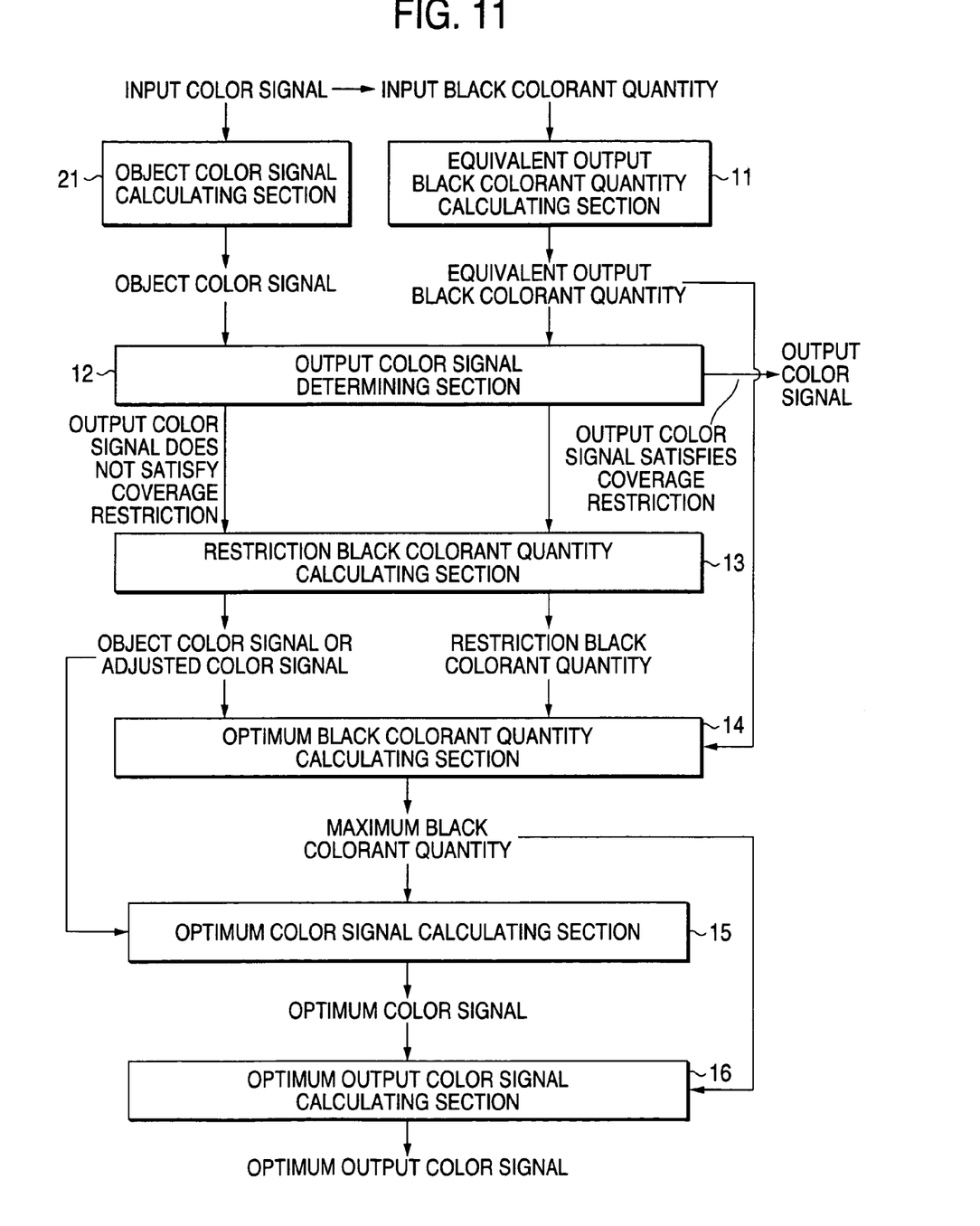
FIG. 11 is a block diagram showing the second embodiment of the color processing method and device according to the invention.

FIG. 11 is a block diagram showing a color processing device and method according to a second embodiment of the invention. In FIG. 11, the same or like parts are designated by the same numerals as in FIG. 1, and the description of those parts is omitted. Reference numeral 21 denotes an object color signal calculating section. In this second embodiment, an input color signal in the input color space containing the black colorant is input.

The object color signal calculating section 21 calculates a color signal in the color space such as L*a*b* space, XYZ space, and sRGB space, which is independent of a device, from the input color signal in the input color space to have the object color signal. This color signal is calculated by giving the input color signal to a statistical method such as a linear regressive analysis, or a color transfer characteristic predictive model made up of a neural network. Also, the color space independent of the device is the object color space in this example.

Also, the equivalent output black colorant quantity calculating section 11 calculates the equivalent output black colorant quantity, which is the black colorant quantity in the output color space equivalent to the black colorant (K) component in the input color signal.

Using the object color signal calculated by the object color signal calculating section 21 in this manner and the equivalent output black colorant quantity calculated by the equivalent output black colorant quantity calculating section 11, processing performed in the output color signal determining section 12 and subsequent sections may be the same as the processing performed in the first embodiment. That is, the output color signal determining section 12 calculates the output color signal from the object color signal and the equivalent output black colorant quantity. If the output color signal satisfies the coverage restriction, its output color signal is output. On the other hand, if the output color signal does not satisfy the coverage restriction, processing in the output color signal determining section 12 and subsequent sections are performed.

In this second embodiment, the optimum output color signal calculating section 16 may not be provided.

Figure 12:
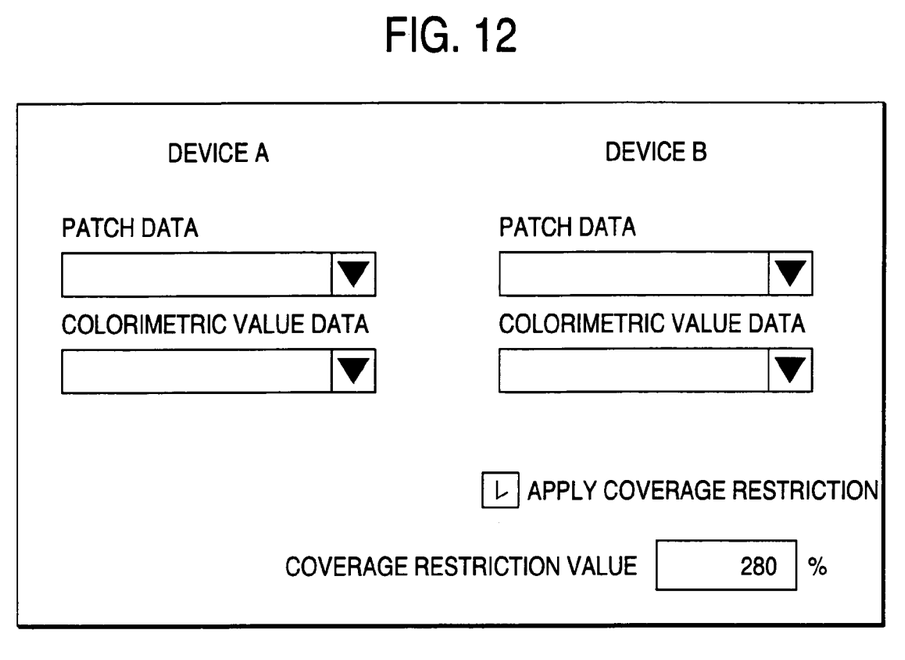
FIG. 12 is a diagram showing a user interface in which the color gamut in the input and output color spaces and the coverage restriction value can be set in the second embodiment of the color processing method and device according to the invention.

FIG. 12 is a diagram showing a user interface in which the color gamut in the input and output color space and the coverage restriction value can be set in the color processing device and method according to the second embodiment of the invention. In an example of FIG. 12, the input color space is the color space of a device A, and the output color space is the color space of a device B. With the user interface as shown in FIG. 12, the color gamuts of device A and device B are defined. For example, the user can select or input a color patch and the data of colorimetric value. Also, with regard to the device B, the user interface has a check box as to whether or not the coverage restriction is made. If the coverage restriction is made, the coverage restriction value can be input. The coverage restriction value may be the default value as preset in the device. Alternatively, the coverage restriction value may be selected from among several restriction values, which are prepared in advance. Also, if the coverage restriction value input by the user is out of the proper range, the input coverage restriction value may not be accepted, for example, due to an error.

In the first embodiment, the same user interface can be employed for the output color space. Also, the color gamut for the object color space may be defined.

Each of the embodiments as above described may be configured by a computer program, in which the functions can be implemented by executing a color processing program on the computer. In this case, the color processing program may be executed independently, built into the OS of the computer, packaged as a device driver, or incorporated as a part of other program.

Also, the color processing program and the data for use with the program may be stored in a computer readable storage medium. Also, the data required for operation may be stored in the computer readable storage medium. The storage medium stores the described contents of the program that are read by the reading device equipped in the hardware resources of the computer in the form of corresponding signals by causing magnetic, optical, or electrical changes in the energy state in accordance with the described contents of the program. For example, the storage medium may be a magnetic disk, an optical disk, a CD-ROM, a memory card, or a memory contained in the computer. Also, the program may be received via a network, stored in the storage medium, and executed.

Figure 13:
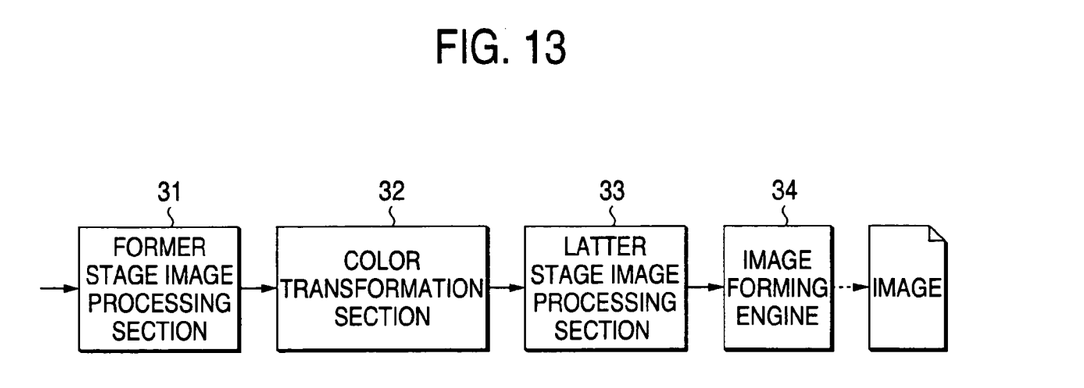
FIG. 13 is a block diagram showing one embodiment of an image forming apparatus according to the invention.

As an application example of the color processing device and method, an image forming apparatus may incorporate the color processing device and method. FIG. 13 is a block diagram showing one embodiment of the image forming apparatus according to the invention. In FIG. 13, reference numeral 31 denotes a former stage image processing section, reference numeral 32 denotes a color transformation section, reference numeral 33 denotes a latter stage image processing section, and reference numeral 34 denotes an image forming engine. This image forming apparatus is provided with the color signal in the object color space such as L*a*b* or RGB, and the input black colorant quantity associated with that color signal as the image data, or the color signal in the input color space containing the black colorant such as YMCK as the image data.

The former stage image processing section 31 performs various kinds of image processing for the input image data before the color transformation by the color transformation section 32. Also, the latter stage image processing section 33 performs various kinds of image processing for the image data after the color transformation. The former stage image processing section 31 or the latter stage image processing section 33 may not be provided. The image forming engine 34 forms the image in accordance with the image data received from the latter stage image processing section 33 (or color transformation section 32), using four color materials containing the black colorant. The output color space is formed by the color materials containing the black colorant for use in this image forming engine 34.

The color transformation section 32 is constituted of the color processing device of the invention, or makes the color processing method. The color transformation section 32 performs the color transformation process into the output color space in the image forming engine 34, and in view of the coverage restriction in the image forming engine 34. Thereby, the image forming engine 34 can form an excellent image with natural color reproduction by preventing a degradation in the color reproducibility due to outside of coverage restriction.

Also, the color transformation section 32 is constituted of the color processing device of the invention, or performs the color processing method, or another method of calculating the output color signal from a pair of the object color signal and the input black colorant quantity or the input color signal containing the black colorant, using the color processing device or method of the invention, and utilizing the input and output correspondence. More specifically, the color transformation section 32 can be applied to the generation of a four dimensional DLUT (direct look-up table). The DLUT is configured by dividing each axis of the color space on the input side into plural sections, and associating the color signal value in the output color space with the coordinates of lattice point. That is, the output color signal may be generated from the object color signal and the input black colorant quantity or the input color signal containing the black colorant corresponding to the lattice point of the DLUT, using the color processing device or method of the invention, and registered as the output value corresponding to the lattice point.

The color transformation section 32 may select one or more lattice points of the four dimensional DLUT near the color signal from the input color signal, using the four dimensional DLUT as created in this manner, and acquire the output value corresponding to the lattice point, and the output value corresponding to the input color signal by interpolation, for example.

Even when the color transformation is made using the four dimensional DLUT, the DLUT is created in view of the coverage restriction, whereby the color signal after conversion satisfies the coverage restriction, and is converted into the color signal with the black colorant quantity on the input side preserved if possible.

A computer program may implement the functions of the color transformation section 32 using the four dimensional DLUT created with the color processing device or method of the invention, in which the program and the four dimensional DLUT data are stored in the storage medium, or may be transferred via the network.

As will be apparent from the above description, with this invention, there is the effect that the given black colorant quantity is preserved, if possible, in making the conversion from the color signal containing the black colorant to the color signal containing the black colorant, and the color signal in the output color space satisfying the coverage restriction and capable of making the natural color reproduction can be obtained. Also, there is the effect that the excellent image can be formed with the natural color reproduction, using the color signal subject to the color processing.

What is claimed is:

1. A color processing method for generating an output color signal containing a black colorant in an output color space from an object color signal in an object color space and an input black colorant quantity associated with the object color signal, the color processing method comprising:
    calculating an equivalent output black colorant quantity in the output color space from the input black colorant quantity, the equivalent output black colorant quantity being equivalent to the input black colorant quantity;
    determining if a first color signal in the output color space satisfies a coverage restriction, the first color signal being calculated from the object color signal and the equivalent output black colorant quantity;
    calculating an optimum black colorant quantity so that a second color signal in the output color space satisfies the coverage restriction if the first color signal does not satisfy the coverage restriction, the second color signal being calculated based on the object color signal and the equivalent output black colorant quantity and has the optimum black colorant quantity, the optimum black colorant quantity being calculated based on the equivalent black colorant quantity and a minimum black colorant quantity of the object color signal satisfying the coverage restriction; and calculating an optimum color signal corresponding to the optimum black colorant quantity.

2. The color processing method according to claim 1, further comprising:

calculating an optimum output color signal having the optimum black colorant quantity based on the optimum black colorant quantity and the optimum color signal, the optimum output color signal satisfying the coverage restriction.

3. A color processing method for generating an output color signal containing a black colorant in an output color space from an input color signal containing the black colorant in an input color space, the color processing method comprising:

calculating an object color signal from the input color signal, the object color signal being a color signal in a color space independent of a device;

calculating an equivalent output black colorant quantity that is equivalent to a black colorant quantity of the input color signal;

calculating a first color signal in the output color space based on the object color signal and the equivalent output black colorant quantity;

determining if the first color signal satisfies a coverage restriction;

calculating an optimum black colorant quantity so that a second color signal in the output color space satisfies the coverage restriction if the first color signal does not satisfy the coverage restriction, the second color signal being calculated based on the object color signal and the equivalent output black colorant quantity and has the optimum black colorant quantity, the optimum black colorant quantity being calculated based on the equivalent black colorant quantity and a minimum black colorant quantity of the object color signal satisfying the coverage restriction; and calculating an optimum color signal corresponding to the optimum black colorant quantity.

4. The color processing method according to claim 3, further comprising:

calculating an optimum output color signal having the optimum black colorant quantity based on the optimum black colorant quantity and the optimum color signal, the optimum output color signal satisfying the coverage restriction.

5. The color processing method according to claim 3, wherein the optimum black colorant quantity is calculated by a weighted average of a restriction black colorant quantity and the equivalent output black colorant quantity; and wherein the restriction black colorant quantity is a minimum black colorant quantity of the object color signal satisfying the coverage restriction.

6. The color processing method according to claim 5, wherein a third color signal is calculated based on the object color signal and a maximum black colorant quantity of color signals in the output color space for reproducing the object color signal;

wherein if the third color signal in the output color space satisfies the coverage restriction, the restriction black colorant quantity is calculated by searching between the maximum black colorant quantity and the equivalent output black colorant quantity so that a sum of the restriction black colorant quantity and a fourth color signal in the output color space satisfies the coverage restriction, the fourth color signal being calculated based on the object color signal except for the restriction black colorant quantity and the restriction black colorant cluantity;

wherein if the third color signal does not satisfy the coverage restriction, the object color signal is set to an adjusted color signal, the adjusted color signal being found by searching starting from the object color signal as a start point in a predetermined compression direction, a fifth color signal in the output color space being calculated based on the adjusted color signal, and the maximum black colorant quantity of the adjusted color signal satisfies the coverage restriction and the adjusted color signal is most closest to the object color signal, and the restriction black colorant quantity is a maximum black colorant quantity of the adjusted color signal.

7. The color processing method according to claim 6, wherein the weighted average uses a ratio depending on at least one of brightness, chroma, and hue calculated from one of the object color signal and the adjusted color signal.

8. The color processing method according to claim 6, wherein the optimum color signal is a color signal closest to one of the object color signal and the adjusted color signal among color signals, the optimum color signal being searched for in the predetermined compression direction from one of the object color signal and the adjusted color signal as a start so that a sixth color signal is calculated based on the optimum color signal and the optimum black colorant quantity satisfies the coverage restriction.

9. The color processing method according to claim 6, wherein the predetermined compression direction is a direction toward one of a fixed point of an achromatic color and a fixed point in a neighbor of the achromatic color.

10. A color processing apparatus for generating an output color signal containing a black colorant in an output color space from an object color signal in an object color space and an input black colorant quantity associated with the object color signal, the color processing apparatus comprising:

an equivalent output black colorant quantity calculating section for calculating an equivalent output black colorant quantity in the output color space from the input black colorant quantity, the equivalent output black colorant quantity being equivalent to the input black colorant quantity;

a color signal determining section for determining if a first color signal in the output color space satisfies a coverage restriction, the first color signal being calculated from the object color signal and the equivalent output black colorant quantity;

an optimum black colorant quantity calculating section for calculating an optimum black colorant quantity so that a second color signal in the output color space satisfies the coverage restriction if the first color signal does not satisfy the coverage restriction, the second color signal being calculated based on the object color signal and the equivalent output black colorant quantity and has the optimum black colorant quantity, the optimum black colorant quantity being calculated based on the equivalent black colorant quantity and a minimum black colorant quantity of the object color signal satisfying the coverage restriction; and an optimum color signal calculating section for calculating an optimum color signal corresponding to the optimum black colorant quantity.

11. The color processing apparatus according to claim 10, further comprising:
an optimum output color signal calculating section for calculating an optimum output color signal having the optimum black colorant quantity based on the optimum black colorant quantity and the optimum color signal, the optimum output color signal satisfying the coverage restriction.

12. A color processing apparatus for generating an output color signal containing a black colorant in an output color space from an input color signal containing the black colorant in an input color space, the color processing apparatus comprising:
an object color signal calculating section for calculating an object color signal from the input color signal, the object color signal being a color signal in a color space independent of a device;
an equivalent output black colorant quantity calculating section for calculating an equivalent output black colorant quantity that is equivalent to a black colorant quantity of the input color signal;
a color signal determining section for calculating a first color signal in the output color space based on the object color signal and the equivalent output black colorant quantity and determining if the first color signal satisfies a coverage restriction;
an optimum black colorant quantity calculating section for calculating an optimum black colorant quantity so that a second color signal in the output color space satisfies the coverage restriction if the first color signal does not satisfy the coverage restriction, the second color signal being calculated based on the object color signal and the equivalent output black colorant quantity and has the optimum black colorant quantity, the optimum black colorant quantity being calculated based on the equivalent black colorant quantity and a minimum black colorant quantity of the object color signal satisfying the coverage restriction; and
an optimum color signal calculating section for calculating an optimum color signal corresponding to the optimum black colorant quantity.

13. The color processing apparatus according to claim 12, further comprising:
an optimum output color signal calculating section for calculating an optimum output color signal having the optimum black colorant quantity based on the optimum black colorant quantity and the optimum color signal, the optimum output color signal satisfying the coverage restriction.

14. The color processing apparatus according to claim 12, further comprising:
a restriction black colorant quantity calculating section for calculating a restriction black colorant quantity, which is a minimum black colorant quantity of the object color signal satisfying the coverage restriction,
wherein the optimum black colorant quantity calculating section calculates the optimum black colorant quantity by a weighted average of a restriction black colorant quantity and the equivalent output black colorant quantity.

15. The color processing apparatus according to claim 14, wherein a third color signal is calculated based on the object color signal and a maximum black colorant quantity of color signals in the output color space for reproducing the object color signal;
wherein if a third color signal in the output color space satisfies the coverage restriction, the restriction black colorant quantity calculating section calculates the restriction black colorant quantity by searching between the maximum black colorant quantity and the equivalent output black colorant quantity so that a sum of the restriction black colorant quantity and a fourth color signal in the output color space satisfies the coverage restriction, the fourth color signal being calculated based on the object color signal except for the restriction black colorant quantity and the restriction black colorant quantity;
wherein if the third color signal does not satisfy the coverage restriction, the object color signal is set to an adjusted color signal, the adjusted color signal being found by searching starting from the object color signal as a start point in a predetermined compression direction, a fifth color signal in the output color space being calculated based on the adjusted color signal, and the maximum black colorant quantity of the adjusted color signal satisfies the coverage restriction and the adjusted color signal is most closest to the object color signal, and the restriction black colorant quantity is a maximum black colorant quantity of the adjusted color signal.

16. The color processing apparatus according to claim 15, wherein the optimum black colorant quantity calculating section uses a ratio depending on at least one of brightness, chroma, and hue calculated from one of the object color signal and the adjusted color signal.

17. The color processing apparatus according to claim 15, wherein the optimum color signal calculating section makes the optimum color signal be a color signal closest to one of the object color signal and the adjusted color signal among color signals, the optimum color signal being searched for in the predetermined compression direction from one of the object color signal and the adjusted color signal as a start so that a sixth color signal calculated from the optimum color signal and the optimum black colorant quantity satisfies the coverage restriction.

18. The color processing apparatus according to claim 15, wherein the predetermined compression direction is a direction toward one of a fixed point of an achromatic color and a fixed point in a neighbor of the achromatic color.

19. The color processing apparatus according to claim 12, further comprising:
a user interface for selecting or inputting one of transformation definition and a colorimetric value, which specify a color gamut of the input color space.

20. The color processing apparatus according to claim 12, further comprising:
a user interface for selecting or inputting a coverage restriction value and one of transformation definition and a colorimetric value, which specify a color gamut of the output color space.

21. The color processing apparatus according to claim 20, wherein the user interface does not accept the coverage restricted value when the coverage restriction value is out of a proper range.

22. A computer readable storage medium storing a program causing a computer to perform a color processing method comprising:
calculating an object color signal based on an input color signal, the object color signal being a color signal in a color space independent of a device;

calculating an equivalent output black colorant quantity equivalent to a black colorant quantity of the input color signal;

calculating a first color signal in the output color space based on the object color signal and the equivalent output black colorant quantity;

determining if the first color signal satisfies a coverage restriction;

calculating an optimum black colorant quantity so that a second color signal in the output color space satisfies the coverage restriction if the first color signal does not satisfy the coverage restriction, the second color signal being calculated based on the object color signal and the equivalent output black colorant quantity and has the optimum black colorant quantity, the optimum black colorant quantity being calculated based on the equivalent black colorant quantity and a minimum black colorant quantity of the object color signal satisfying the coverage restriction; and calculating an optimum color signal corresponding to the optimum black colorant quantity.

23. An image forming apparatus for forming on a recording medium one of 1) an image represented by a first object color signal in an object color space and an input black colorant quantity associated with the first object color signal. and 2) an image represented by an input color signal containing a black colorant in an input color space, the image forming apparatus comprising:

a color processing section including:

an object color signal calculating section for calculating a second object color signal based on the input color signal, the second object color signal being a color signal in a color space independent of a device;

an equivalent output black colorant quantity calculating section for calculating an equivalent output black colorant quantity that is equivalent to one of the input black colorant quantity and a black colorant quantity of the input color signal;

a color signal determining section for calculating a first color signal in an output color space based on the first and second object color signals and the equivalent output black colorant quantity and determining if the first color signal satisfies a coverage restriction;

an optimum black colorant quantity calculating section for calculating an optimum black colorant quantity so that a second color signal in the output color space satisfies the coverage restriction if the first color signal does not satisfy the coverage restriction, the second color signal being calculated based on one of the first and second object color signals and the equivalent output black colorant quantity and has the optimum black colorant quantity, the optimum black colorant quantity being calculated based on the equivalent black colorant quantity and a minimum black colorant quantity of the object color signal satisfying the coverage restriction; and an optimum color signal calculating section for calculating an optimum color signal corresponding to the optimum black colorant quantity; and an image forming section for forming the image on the recording medium in accordance with an output color signal generated by the color processing section.

24. An image forming apparatus for forming on a recording medium one of 1) an image represented by a first object color signal in an object color space and an input black colorant quantity associated with the first object color signal and 2) an image represented by an input color signal containing a black colorant in an input color space, the image forming apparatus comprising:

a color processing section performing a color processing including:

calculating a second object color signal from the input color signal, the second object color signal being a color signal in a color space independent of a device;

calculating an equivalent output black colorant quantity equivalent to one of the input black colorant quantity and a black colorant quantity of the input color signal;

calculating a first color signal in an output color space based on one of the first and second object color signals and the equivalent output black colorant quantity;

determining if the first color signal satisfies a coverage restriction;

calculating an optimum black colorant quantity so that a second color signal in the output color space satisfies the coverage restriction if the first color signal does not satisfy the coverage restriction, the second color signal being calculated from one of the first and second object color signals and the equivalent output black colorant quantity and has the optimum black colorant quantity, the optimum black colorant quantity being calculated based on the equivalent black colorant quantity and a minimum black colorant quantity of the object color signal satisfying the coverage restriction; and calculating an optimum color signal corresponding to the optimum black colorant quantity; and an image forming section for forming the image on the recording medium in accordance with an output color signal generated by the color processing section.

25. The color processing method of claim 1, wherein the input black colorant quantity is not derived from the object color signal.

26. The color processing method of claim 10, wherein the input black colorant quantity is not derived from the object color signal.

27. The color processing method of claim 12, wherein the input black colorant quantity is not derived from the object color signal.

28. The color processing method of claim 23, wherein the input black colorant quantity is not derived from the object color signal.

29. The color processing method of claim 24, wherein the input black colorant quantity is not derived from the object color signal.

30. The color processing method of claim 3, wherein the black colorant is not derived from other portions of the input color signal.

31. The computer readable storage medium of claim 22, wherein the black colorant quantity of the input signal is not derived from other portions of the input signal.

* * * * *